United States Patent
Huang

(10) Patent No.: US 9,672,523 B2
(45) Date of Patent: Jun. 6, 2017

(54) GENERATING BARCODE AND AUTHENTICATING BASED ON BARCODE

(71) Applicant: Alibaba Group Holding Limited, Grand Cayman (KY)

(72) Inventor: Mian Huang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/618,882

(22) Filed: Feb. 10, 2015

(65) Prior Publication Data

US 2015/0227946 A1    Aug. 13, 2015

(30) Foreign Application Priority Data

Feb. 11, 2014    (CN) .......................... 2014 1 0047999

(51) Int. Cl.
| | |
|---|---|
| *G06K 5/04* | (2006.01) |
| *G06K 7/10* | (2006.01) |
| *G06K 9/32* | (2006.01) |
| *G06Q 30/00* | (2012.01) |

(52) U.S. Cl.
CPC ................................ *G06Q 30/0185* (2013.01)

(58) Field of Classification Search
USPC ............... 235/375, 494, 462.01–462.09, 383
See application file for complete search history.

(56) References Cited

U.S. PATENT DOCUMENTS

| | | | | | |
|---|---|---|---|---|---|
| 7,307,491 | B2* | 12/2007 | Khazanov | ............... | H01P 1/127 333/105 |
| 7,353,987 | B2* | 4/2008 | Matsuura | ................. | G06K 1/14 235/375 |
| 7,523,864 | B2* | 4/2009 | Manheim | ........... | G06K 7/10861 235/375 |
| 7,523,865 | B2* | 4/2009 | Tomita | ............... | H04N 1/32133 235/375 |
| 7,628,330 | B2* | 12/2009 | Tomita | ............... | H04N 1/32133 235/375 |

(Continued)

OTHER PUBLICATIONS

PCT Search Report and Written Opinion mailed May 14, 2015 for PCT Application No. PCT/US15/15256, 8 Pages.

*Primary Examiner* — Tuyen K Vo
(74) *Attorney, Agent, or Firm* — Lee & Hayes, PLLC

(57) ABSTRACT

Operation identification is obtained from a captured barcode. An authentication criterion is determined whether is satisfied. If the authentication criterion is met, the operation identification and stored account information is sent to server for authenticating based on the account information. The authentication criterion includes whether a similarity degree between an image characteristic of a first surrounding image of a barcode and an image characteristic of a second surrounding image of the barcode is larger than or equal to a present threshold. The second surrounding image is an authenticated surrounding image of the barcode such as a surrounding image when the barcode is generated. The present techniques ensure that a successful authentication is possibly returned only when the first surrounding image is in consistent with the second image. It is difficult for the barcode placed on a fake webpage or sent through group sending by a hacker to pass authentication.

20 Claims, 10 Drawing Sheets

(56) References Cited

U.S. PATENT DOCUMENTS

| | | | |
|---|---|---|---|
| 7,865,042 B2* | 1/2011 | Cattrone | G06F 17/30011 235/462.01 |
| 7,938,330 B2* | 5/2011 | Kiuchi | G06K 7/1417 235/454 |
| 8,379,261 B2* | 2/2013 | Ming | G07D 7/2025 235/462.01 |
| 8,424,751 B2* | 4/2013 | Liu | G06K 19/06103 235/375 |
| 8,550,367 B2* | 10/2013 | Fan | G06K 19/06103 235/454 |
| 8,763,919 B1* | 7/2014 | Washington | G06Q 10/107 235/462.01 |
| 2003/0052178 A1 | 3/2003 | Zeller et al. | |
| 2003/0095596 A1* | 5/2003 | Shimizu | G06T 9/20 375/240.08 |
| 2003/0147549 A1 | 8/2003 | Choi et al. | |
| 2008/0023546 A1* | 1/2008 | Myodo | G06K 7/14 235/462.04 |
| 2008/0265015 A1* | 10/2008 | Tomita | G06F 17/2288 235/375 |
| 2009/0116074 A1 | 5/2009 | Wilsher | |
| 2010/0220364 A1* | 9/2010 | Picard | G03G 21/046 358/3.28 |
| 2011/0121066 A1* | 5/2011 | Tian | G06K 19/14 235/375 |
| 2011/0161674 A1* | 6/2011 | Ming | G06F 21/64 713/181 |
| 2011/0186632 A1 | 8/2011 | Yi et al. | |
| 2011/0290880 A1* | 12/2011 | Cai | G06K 7/14 235/437 |
| 2012/0054046 A1* | 3/2012 | Albisu | G06Q 20/20 705/16 |
| 2012/0109765 A1* | 5/2012 | Araque | G06Q 30/0601 705/26.1 |
| 2012/0166309 A1 | 6/2012 | Hwang et al. | |
| 2013/0001290 A1 | 1/2013 | Trajkovic et al. | |
| 2013/0181054 A1 | 7/2013 | Durham et al. | |
| 2013/0228629 A1 | 9/2013 | Fan et al. | |
| 2013/0232425 A1* | 9/2013 | Lippmann | G06F 3/048 715/741 |
| 2013/0268624 A1* | 10/2013 | Yagiura | H04L 67/025 709/217 |

* cited by examiner

GENERATING BARCODE AND AUTHENTICATING BASED ON BARCODE

CROSS-REFERENCE TO RELATED PATENT APPLICATIONS

This application claims foreign priority to Chinese Patent Application No. 201410047999.5 filed Feb. 11, 2014 entitled "Method for Generating Bar Code and Method and Terminal for Authenticating Based on Bar Code," which is hereby incorporated by reference in its entirety.

TECHNICAL FIELD

The present disclosure relates to a technical field of information security, and, more particularly, to a method for generating a barcode and a method and a terminal for authenticating based on the barcode.

BACKGROUND

With the rapid development of the Internet and smart devices, a barcode is used as an agile and convenient information communicating medium which people use in their daily lives. A barcode includes a one-dimensional barcode, a two-dimensional barcode, a color barcode, etc.

Nowadays, many merchants introduce functions that use the barcode to implement payment, login, etc., which are very convenient for users. In fact, the above functions are realized based on an authentication process of barcode. For example, in a situation where a user uses a terminal, such as a personal computer (PC), to generate a barcode for a login operation, and a terminal, such as a cell phone, is then used to take a photo of the generated barcode and then send stored account information to a server where an authentication is performed in connection to the login operation. If the authentication is successful, the server will return a message of successful authentication to the terminal and the terminal then performs login operation based on the account information.

However, as most barcodes cannot be recognized by human's eyes, in the authentication process based on the barcode as above, hackers may be able to take advantage of the users by luring the users to take photos of the barcode so as to steal data or resources from the users, thereby resulting in lower security. For example, a hacker may place the barcode corresponding to the login operation on a fake webpage or send the barcode to the users via a communication tool in a batch with words that lure the users to take the photos of the barcodes. After the user takes photo of the barcode and use the barcode for login operation, the user's relevant information is stolen by the hacker.

For example, a hacker may order an item from an e-commerce website and a barcode is generated for payment of such item. The hacker, however, does not pay for the item via the barcode. Instead, the hacker places the barcode on some other webpage and falsely links the barcode to some other item. For instance, the hacker may misguide the user by linking the barcode to another item that the hacker is selling online. When the user scans the barcode and pays via the barcode, the user actually pays the item for the hacker. The hacker thus steals money from the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

The present disclosure provides a method for generating a barcode and a method and a terminal for authenticating based on the barcode to resolve the technical problem that lowers a probability for a hacker to steal user's data or resources and enhances security in the authentication process based on the barcode.

The present disclosure provides an example method for generating a barcode.

A first terminal obtains an operating identification. The operating identification corresponds to a specific operation at the first terminal. An image characteristic of a surrounding image that surrounds an area of the barcode to be generated is obtained. The barcode is generated based on the operating identification and the image characteristic. The image characteristic is used as an image characteristic of the surrounding image for generating the barcode. For instance, the image characteristic is used as an image characteristic of the surrounding image of the generated barcode.

Optionally, the first terminal also obtains size information of the area of the barcode to be generated. The barcode is generated based on the size information too. Alternatively the size information may be sent to a server to store the size information. The size information is used as size information for generating the barcode. For instance, the size information is used as size information of the generated barcode.

The present disclosure also provides another example method for generating a barcode.

A first terminal obtains an operating identification. The operating identification corresponds to a specific operation at the first terminal. The barcode is generated based on the operating identification. An image characteristic of a surrounding image that surrounds the barcode is obtained. The image characteristic is sent to a server to store the image characteristics. The image characteristic is used as the image characteristic of the surrounding image that surrounds the generated barcode.

Optionally, the first terminal also obtains size information of the barcode. The barcode is generated based on the size information too. The size information may be sent to a server to store the size information. The size information is used as size information for generating the barcode. For instance, the size information is used as size information of the generated barcode.

The present disclosure also provides an example method for authenticating based on a barcode.

A second terminal captures a barcode and a surrounding image that surrounds the captured barcode. For example, the barcode is generated at a first terminal and then transmitted to and photographed at the second terminal. An operating identification is obtained from the barcode. The operating identification corresponds to a specific operation at the first terminal.

The present techniques determine whether an authentication criterion is met. If the authentication criterion is met, the operating identification and account information stored in the second terminal are sent to the server. The server returns, to the first terminal, a message indicating the authentication of the specific operation is successful after the server determines that the account information is authenticated.

For example, the authentication criterion may include whether a similarity degree between an image characteristic of a surrounding image of the barcode that is captured ("captured barcode") and an image characteristic of a surrounding image of the barcode that is generated ("generated barcode") is larger than or equal to a preset threshold. For example, the surrounding image of the generated barcode is a trust-worthy image. For another example, the surrounding image of the generated barcode is a surrounding image of the barcode that is generated at the first terminal.

For example, the image characteristic of the surrounding image of the generated barcode is obtained from the barcode by the second terminal.

For another example, the image characteristic of the surrounding image of the generated barcode is obtained from the server by the second terminal.

Optionally, prior to the step of determining whether the authentication criterion is met, the second terminal obtains size information of the generated barcode. Size information of the captured barcode is calculated.

Based on the size information of the generated barcode and the size information of the captured barcode, the image characteristic of the surrounding image of the generated barcode and the image characteristic of the surrounding image of the captured barcode are adjusted to have a same or similar size scale.

The present disclosure also provides another example method for authenticating based on a barcode.

A second terminal captures a barcode and a surrounding image that surrounds the captured barcode. For example, the barcode is generated at a first terminal and then transmitted to and photographed at the second terminal. An operating identification is obtained from the barcode. The operating identification corresponds to a specific operation at the first terminal.

The operating identification, the image characteristic of the surrounding image of the captured barcode, and account information stored in the second terminal are sent to a server. The server returns to the first terminal a message indicating that the authentication of the specific operation is successful when the server determines that an authentication criterion is met and the account information is authenticated.

For example, the authentication criterion may include whether a similarity degree between an image characteristic of a surrounding image of the captured barcode and an image characteristic of a surrounding image of the generated barcode is larger than or equal to a preset threshold.

For example, the image characteristic of the surrounding image of the generated barcode is obtained from the barcode by the second terminal.

For another example, the image characteristic of the surrounding image of the generated barcode is obtained from the server by the second terminal or by the server.

Optionally, prior to the step of determining whether the authentication criterion is met, the second terminal obtains size information of the bar code when the barcode is generated. Size information of the captured barcode is calculated.

Based on the size information of the generated barcode and the size information of the captured barcode, the image characteristic of the surrounding image of the generated barcode and the image characteristic of the surrounding image of the captured barcode are adjusted to have a same or similar size scale.

The present disclosure also provides an example terminal. The terminal is a first terminal which may include the following units.

A first obtaining unit obtains an operating identification. The operating identification corresponds to a specific operation at the first terminal. A second obtaining unit obtains an image characteristic of a surrounding image that surrounds an area of a barcode to be generated. A generating unit generates the barcode based on the operating identification and the image characteristic. The image characteristic is used as an image characteristic of the surrounding image for generating the barcode. For instance, the image characteristic of the surrounding image of the generated barcode is used as the image characteristic of the surrounding image generated at the first terminal.

Optionally, the first terminal may also include a third obtaining unit that obtains size information of the area of the barcode to be generated. The generating unit generates the barcode based on the size information too.

Optionally, the first terminal may also include a sending unit. The sending unit sends the size information to the server to store the size information. The size information is used as size information for generating the barcode. For instance, the size information is used as size information of the barcode generated at the first terminal.

The present disclosure also provides another example terminal. The terminal is a first terminal which may include the following units.

A first obtaining unit obtains an operating identification. The operating identification corresponds to a specific operation at the first terminal. A generating unit generates a barcode based on the operation identification. A second obtaining unit obtains an image characteristic of a surrounding image that surrounds the barcode. A sending unit sends the image characteristic to a server to store the image characteristics. The image characteristic is used as an image characteristic of the surrounding image that surrounds the barcode. For instance, the image characteristic is used as an image characteristic of the surrounding image that surrounds the barcode generated at the first terminal.

Optionally, the first terminal may also include a third obtaining unit that obtains size information of the barcode. The generating unit also generates the barcode based on the size information. Optionally, the sending unit sends the size information to the server to store the size information. The size information is used as size information for generating the barcode. For instance, the size information is size information of the barcode generated at the first terminal.

The present disclosure also provides another example terminal. The terminal is a second terminal which may include the following units.

A first obtaining unit captures a barcode and a surrounding image that surrounds the captured barcode. For example, the barcode is generated at a first terminal and then transmitted to and photographed at the second terminal. A second obtaining unit obtains an operating identification from the barcode. The operating identification corresponds to a specific operation of a first terminal.

A determining unit determines whether an authentication criterion is met. If the authentication criterion is met, the operating identification and account information stored in the second terminal are sent to the server. The server returns, to the first terminal, a message indicating that the authentication of the specific operation is successful after the server determines that the account information is authenticated.

For example, the authentication criterion may include whether a similarity degree between an image characteristic of a surrounding image of the captured barcode and an image characteristic of a surrounding image of the generated barcode is larger than or equal to a preset threshold.

For example, the image characteristic of the surrounding image of the generated barcode is obtained from the barcode by the second terminal.

For another example, the image characteristic of the surrounding image of the generated barcode is obtained from the server by the second terminal.

Optionally, the second terminal may also include a third obtaining unit, a calculating unit, and an adjusting unit. The third obtaining unit, prior to the step of determining whether the authentication criterion is met, obtains size information of the bar code when the barcode is generated.

The calculating unit calculates size information of the captured barcode. The adjusting unit, based on the size information of the captured barcode and the size information of the generated barcode, adjusts the image characteristic of the surrounding image of the generated barcode and the image characteristic of the surrounding image of the captured barcode to have a same or similar size scale.

The present disclosure also provides another example terminal. The terminal is a second terminal which may include the following units.

A first obtaining unit captures a barcode and a surrounding image that surrounds the captured barcode. For example, the barcode is generated at a first terminal and then transmitted to and photographed at the second terminal. A second obtaining unit obtains an operating identification from the captured barcode. The operating identification corresponds to a specific operation at the first terminal.

A sending unit sends the operating identification, the image characteristic of the surrounding image of the captured barcode, and account information stored in the second terminal to a server. The server returns to the first terminal a message indicating that the authentication of the specific operation is successful when the server determines that an authentication criterion is met and the account information is authenticated.

For example, the authentication criterion may include whether a similarity degree between an image characteristic of a surrounding image of the captured barcode and an image characteristic of a surrounding image of the generated barcode is larger than or equal to a preset threshold.

For example, the image characteristic of the surrounding image of the generated barcode is obtained from the barcode by the second terminal.

For another example, the image characteristic of the surrounding image of the generated barcode is obtained from the server by the second terminal or by the server itself.

Optionally, the second terminal may also include a third obtaining unit, a calculating unit, and an adjusting unit. The third obtaining unit, prior to the step of determining whether the authentication criterion is met, obtains size information of the generated barcode.

The calculating unit calculates size information of the captured barcode. The adjusting unit, based on the size information of the generated barcode and the size information of the captured barcode, adjusts the image characteristic of the surrounding image of the generated barcode and the image characteristic of the surrounding image of the captured barcode to have a same or similar size scale.

According to the present techniques, when a first terminal generates a barcode with respect to a specific operation, image characteristic of a surrounding image that surrounds the generated barcode is stored. When an authentication operation is performed, the present techniques determine whether a similarity degree between the image characteristic of the surrounding image of the generated barcode and an image characteristic of a surrounding image of the captured is larger than or equal to a preset threshold. If a result is positive, the surrounding image of the captured barcode is consistent with the surrounding image of the generated barcode. If an authentication based on the account information is successful, a message indicating that the authentication is successful is returned. The present techniques ensure that the message indicating that the authentication is successful is returned when the surrounding image of the barcode captured at the second terminal is consistent with the surrounding image of the barcode generated at the first terminal. Thus, a barcode placed by a hacker on a fake webpage or through a group sending becomes difficult to be used for authentication. The present techniques lower a probability for a hacker to steal users' data or resources and enhance security of authentication based on the barcode.

BRIEF DESCRIPTION OF THE DRAWINGS

To clarify the technical solution of the present disclosure and the existing technology, the following description briefly illustrate the drawings used in the present disclosure and the existing technology. Apparently, the following described FIGs are only a part of the embodiments of the present disclosure. A person with ordinary skill in the art may obtain other figures or embodiments based on following FIGs without using creative efforts.

DETAILED DESCRIPTION OF THE EMBODIMENTS

To clarify the technical solutions of the present disclosure, the technical solution of the present disclosure is described by reference to FIGs of the present disclosure. Apparently, the example embodiments described herein are only part of and do not represent all of the embodiments of the present disclosure. Based on the example embodiments in the present disclosure, all other embodiments obtained by one of ordinary skill in the art without using creative efforts fall within the scope of the present disclosure.

Figure 1:
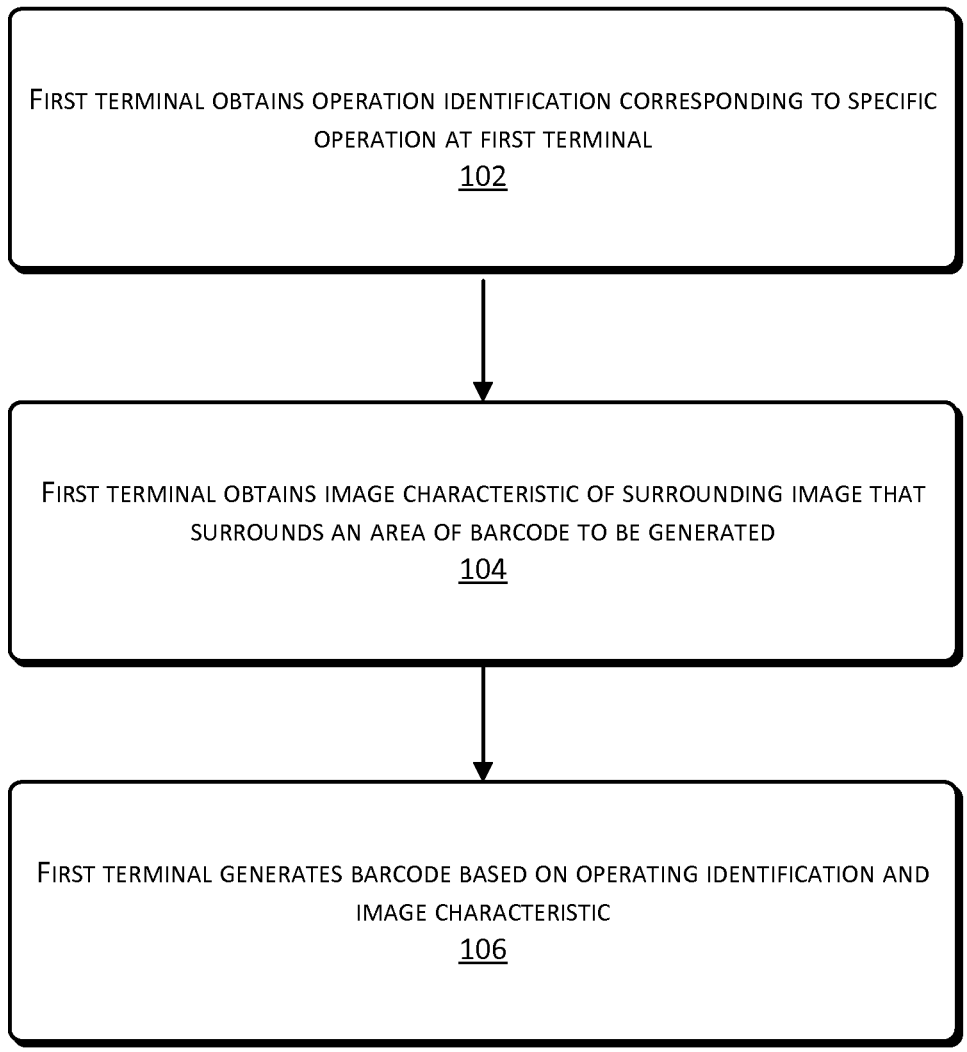
FIG. 1 is a flowchart illustrating a first example embodiment of an example method for generating a barcode according to of the present disclosure.

FIG. 1 is a flowchart illustrating a first example embodiment of an example method for generating a barcode according to the present disclosure. This example embodiment may be applied at a first terminal.

At 102, the first terminal obtains an operating identification. The operating identification corresponds to a specific operation at the first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit the details of the operating identification.

For example, the first terminal may be any terminal equipment such as a PC, a cell phone, a PAD, etc.

At 104, the first terminal obtains an image characteristic of a surrounding image that surrounds an area of a barcode to be generated.

For example, prior to generating the barcode, the first terminal allocates an area where the barcode is generated. This area is the area of the barcode to be generated.

For example, the first terminal obtains the surround image that surrounds the area of the barcode to be generated and extracts the image characteristic of the surrounding image. The surrounding image surrounds the barcode. It is not necessary that the surrounding image connects to a border of the barcode as long as the surrounding image is within a preset area adjacent to the barcode. For example, the surrounding image may be an image at a first area that is on top of the barcode, or an image at a second area that is at a left side of the barcode, or a combination of these two areas. For example, the surrounding image may be obtained by the first terminal by using a screenshot capture program, such as a browser screenshot plug-in program.

For example, the image characteristic may by any one or more of the characteristics including a grayscale characteristic, a color characteristic, and a character characteristic of the image. For instance, the first terminal obtains a grayscale bar chart of the surrounding image, or performs an optical character recognition (OCR) of the surrounding image to obtain the character characteristic.

A size of the obtained surrounding image may be preset. Security of authentication process may be enhanced by obtaining a large size of the surrounding image. For example, the size of the surrounding mage may be more than half of a displaying screen or even a whole displaying screen.

For example, an execution sequence of the operations at 102 and 104 is not limited, which may be executed concurrently or by a certain sequence.

At 106, the first terminal generates the barcode based on the operating identification obtained at 102 and the image characteristic obtained at 104. The image characteristic is used as the image characteristic of the surrounding image of the generated barcode.

For example, the barcode may include a one-dimensional barcode, a two-dimensional barcode, a color barcode, etc.

In the example embodiment of the present disclosure, the barcode is generated based on the operating identification and the image characteristic. That is, the generated barcode includes information of the operating identification and the image characteristic. In addition, the image characteristic of the barcode generated at the first terminal is used to verify, during the authentication of the barcode, whether the image characteristic of the generated barcode is consistent with the image characteristic of the surrounding image of a captured barcode.

In this example embodiment, the barcode is generated based on not only the operating identification corresponding to the specific operation but also the image characteristic of the surrounding image when the barcode is generated. Therefore when the authentication operation is performed based on the generated barcode in this example embodiment, the present techniques also verify whether the image characteristic of the surrounding image of the captured barcode is consistent with the image characteristic of the surrounding image of the generated barcode. Only when they are consistent, the message indicating that the authentication is successful is returned. Thus, a barcode placed by a hacker on a fake webpage or through a group sending becomes difficult to be used for authentication. The present techniques lower a probability for a hacker to steal users' data or resources and enhance security of authentication based on the barcode.

When the barcode generated according to this example embodiment is captured, as it is difficult to ensure sizes of different images are same, it is difficult to compare image characteristics of different surrounding images.

To solve this technical problem, in this example embodiment, the example method may further include the following operations. The first terminal obtains size information of the area of the barcode to be generated. The barcode is generated based on the size information too. Or the size information is sent to a server to store the size information. The size information is used as size information of the generated barcode. In other words, in this example embodiment, the size information of the area of the barcode to be generated may also be used as the size information of the generated barcode, and the size information is added into the barcode or stored in the server. Therefore, when image characteristic of the surrounding image of the barcode is verified, the size information of the generated barcode and the size information of the captured barcode may be used to adjust the two image characteristics of the surrounding images to be compared at a same or similar size scale for comparison.

In this example embodiment, the image characteristic of the surrounding image may be added into the barcode such that the image characteristic of the surrounding image is verified when the authentication operation based on the barcode is performed. In fact, the present disclosure also provides another method for generating a barcode, which also implements verification of the image characteristic of the surrounding image and is described in the following example embodiment.

Figure 2:
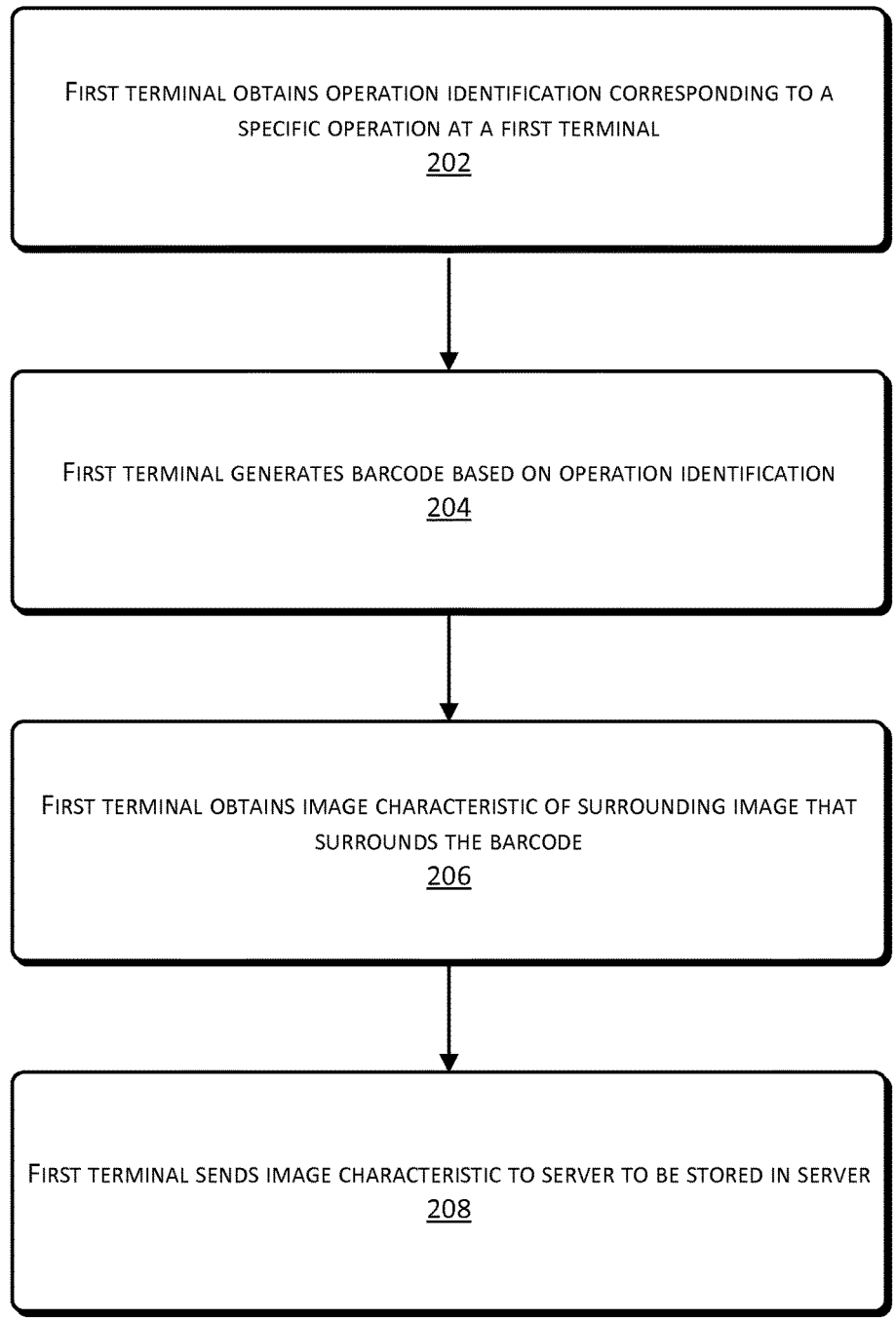
FIG. 2 is a flowchart illustrating a second example embodiment of an example method for generating a barcode according to the present disclosure.

FIG. 2 is a flowchart illustrating a second example embodiment of an example method for generating a barcode according to of the present disclosure. This example embodiment may be applied at a first terminal.

At 202, the first terminal obtains an operating identification. The operating identification corresponds to a specific operation at the first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

For example, the first terminal may be any terminal equipment such as a PC, a cell phone, a PAD, etc.

At 204, the first terminal generates the barcode based on the operating identification obtained at 202.

For example, the barcode may include a one-dimensional barcode, a two-dimensional barcode, a color barcode, etc.

In the embodiment of the present disclosure, the barcode is generated based on the operating identification. That is, information of the operating identification is included in the generated barcode.

At 206, the first terminal obtains an image characteristic of a surrounding image that surrounds the barcode.

For example, the first terminal obtains the surround image that surrounds the barcode and extracts the image characteristic of the surrounding image. The surrounding image surrounds the barcode. It is not necessary that the surrounding image connects to a border of the barcode as long as the surrounding image is within a preset area adjacent to the barcode. For example, the surrounding image may be an image at a first area that is on top of the barcode, or an image at a second area that is at a left side of the barcode, or a combination of these two areas. For example, the surrounding image may be obtained by the first terminal by using a screenshot capture program, such as a browser screenshot plug-in program.

For example, the image characteristic may by any one or more of the following characteristics including a grayscale characteristic, a color characteristic, and a character characteristic of the image. For instance, the first terminal obtains a grayscale bar chart of the surrounding image, or performs an optical character recognition (OCR) of the surrounding image to obtain the character characteristic.

A size of the obtained surrounding image may be preset. Security of authentication process may be enhanced by obtaining a larger size of the surrounding image. For example, the size of the surrounding mage may be more than half of a displaying screen or even a whole displaying screen.

For example, operations at 206 may be performed after operations at 204. In other words, after the barcode is generated, the surrounding image of the barcode is obtained so as to retrieve the image characteristic of the surrounding image. For another example, operations at 206 may be performed before operations at 204. In other words, the surrounding image of the area of the barcode to be generated is obtained and used as the surrounding image of the generated barcode and then the image characteristic of the surrounding image is extracted.

At 208, the first terminal sends the image characteristic to the server to be stored in the server. The image characteristic is used as the image characteristic of the surrounding image that surrounds the generated barcode.

This example embodiment is different from the first embodiment in which, in this example embodiment, the image characteristic of the surrounding image of the generated barcode is not added into the barcode and is stored in the server instead. The image characteristic of the surrounding image of the generated barcode is used for verifying, in a barcode authentication, whether it is consistent with the image characteristic of the surrounding image of the captured barcode.

In this example embodiment, the image characteristic of the surrounding image when the barcode is generated is sent to the server to store the image characteristic of the surrounding image of the generated barcode in the server. When performing the authentication operation based on the barcode generated in this example embodiment, the image characteristic of the surrounding image of the generated barcode and the image characteristic of the surrounding image of the captured barcode are compared to verify whether they are consistent. Only when they are consistent, the message indicating the authentication is successful is returned. Thus, a barcode placed by a hacker on a fake webpage or through a group sending becomes difficult to be used for authentication. The present techniques lower a probability for a hacker to steal users' data or resources and enhance security of authentication based on the barcode.

When the barcode generated according to this example embodiment is captured, as it is difficult to ensure sizes of different images are same, it is difficult to compare image characteristics of different surrounding images.

To solve this technical problem, in this example embodiment, the example method may further include following operations. The first terminal obtains size information of the barcode. The barcode is generated based on the size information too. Or the size information is sent to a server to store the size information. In other words, the size information of the barcode is added into the barcode or is stored in the server. Therefore, when a verification operation is applied to the image characteristic of the surrounding image of the barcode, the size information of the generated barcode and the size information of the captured barcode may be used so that the two compared image characteristics of the two surrounding images are adjusted to be within the same or similar size scale for comparison.

In the above two examples embodiments, the image characteristic of the surrounding image of the barcode is stored in the barcode or in the server when the barcode is generated to verify the image characteristic of the surrounding image during performing authentication operation based on the barcode. Therefore, an authentication is successful only when the surrounding image of the captured barcode is consistent with the surrounding image of the generated barcode.

The following description describes example authentication processes based on the generated barcodes in the example embodiments.

Figure 3:
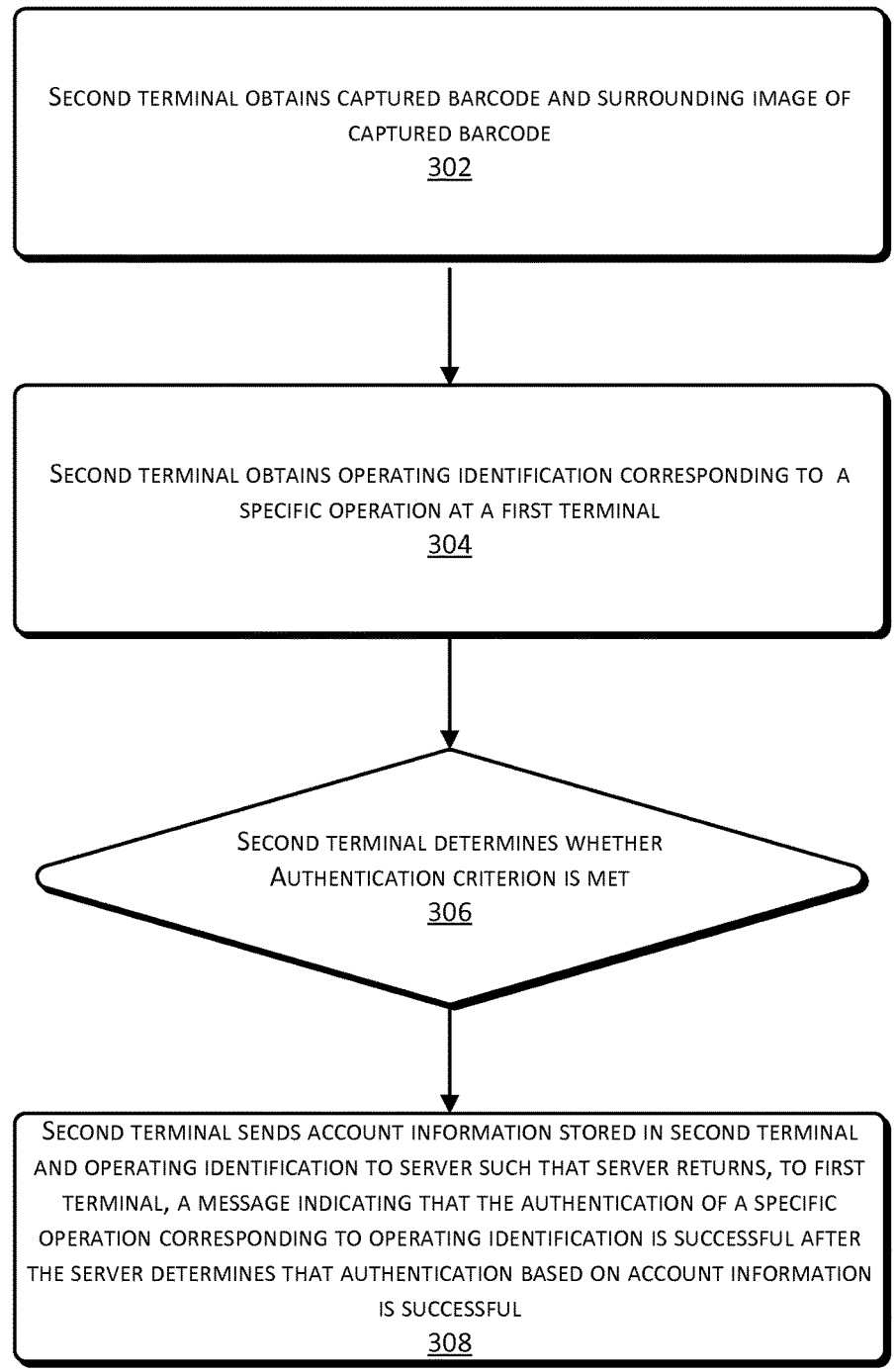
FIG. 3 is a flowchart illustrating a first example embodiment of an example method for authenticating based on a barcode according to the present disclosure.

FIG. 3 is a flowchart illustrating a first example embodiment of an example method for authenticating based on a barcode according to the present disclosure. This example embodiment may be applied at a second terminal.

At 302, a second terminal obtains a captured barcode and a surrounding image of the captured barcode.

For example, the barcode and the surrounding image captured at 302 may be generated by either the first example embodiment or the second example embodiment as shown in FIGS. 1 and 2 respectively.

For example, the second terminal may be a terminal device such as a computer, a cell phone, a PAD, etc. The second terminal may also include a capturing apparatus that has capturing or photographing functionalities.

For example, the barcode in the example embodiment of the present disclosure may include a one-dimensional barcode, a two-dimensional barcode, a color barcode, etc.

At 304, the second terminal obtains an operating identification. The operating identification corresponds to a specific operation at a first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

At 306, the second terminal determines whether an authentication criterion is met. If the authentication criterion is met, operations at 308 are performed. For example, the authentication criterion may include whether a similarity degree between an image characteristic of the surrounding image of the captured barcode and an image characteristic of the surrounding image of the generated barcode is larger than or equal to a preset threshold.

The second terminal determines whether the authentication criterion is met, i.e., whether the similarity degree between the image characteristic of the surrounding image of the captured barcode and the image characteristic of the surrounding image of the generated barcode is larger than or equal to the preset threshold. If a result is positive, then the authentication criterion is met and the surrounding image of the captured barcode is consistent with the surrounding image of the generated barcode. The barcode is determined not as a barcode placed on a fake webpage by the hacker or is massively sent by the hacker. Thereafter, operations at 308 are allowed to perform.

For example, the image characteristic of the surrounding image of the captured barcode is extracted from the surrounding image of the captured barcode obtained at 302 by the second terminal. The second terminal also obtains the image characteristic of the surrounding image of the generated barcode. For example, if the barcode and the surrounding image obtained at 302 are those generated according to the first example embodiment as shown in FIG. 1, then the image characteristic of the surrounding image of the generated barcode is obtained from the captured barcode by the second terminal. If the barcode and the surrounding image obtained at 304 are those generated according to the second example embodiment as shown in FIG. 2, then the image characteristic of the surrounding image of the generated barcode is obtained from the server by the second terminal.

It is noted that position information of the image characteristic of the surrounding image of the captured barcode is consistent with the position information of the image characteristic of the surrounding image of the generated barcode. For example, if the image characteristic of the surrounding image of the generated is the image characteristic of the first surrounding area of the generated barcode, then the image characteristic of the surrounding image of the captured barcode is the image characteristic of the first surrounding area of the captured barcode.

At 308, the second terminal sends account information stored in the second terminal and the operating identification to the server such that the server returns, to the first terminal, a message indicating an authentication of the specific operation corresponding to the operating identification is successful after the server determines that an authentication based on the account information is successful. When the first terminal receives the message indicating that the authentication is successful, the first terminal authorizes the specific operation.

The second terminal stores the account information of the user. After the authentication criterion is met, i.e., the surrounding image of the captured barcode is consistent with the surrounding image of the generated barcode, the second terminal sends the stored account information and the operating identification to the server. The server returns, to the first terminal, a message indicating the authentication of the specific operation is successful after the server determines that the authentication is successful based on the account information. If the server determines that the authentication is failed based on the account information, the server returns, to the first terminal, a message indicating that the authentication of the specific operation corresponding to the operating identification is failed. The first terminal displays an indication of operation failure.

In this example embodiment, prior to performing the authentication operation based on the barcode, the second terminal determines whether the authentication criterion is met. That is, whether the image characteristic of the surrounding image of the generated barcode is consistent with the image characteristic of the surrounding image of the captured barcode is verified. Only when they are consistent, the server is then enabled to perform authentication based on the account information, and returns the message indicating the authentication is successful. Thus, it is difficult for the hacker to place the barcode on a fake webpage or send the barcode through a group sending. The present techniques lower a probability for a hacker to steal users' data or resources and enhance security of authentication based on the barcode.

When the barcode generated according to this example embodiment is captured, as it is difficult to ensure sizes of different images are same, it is difficult to compare image characteristics of different surrounding images.

To solve this technical problem, in this example embodiment, prior to determining whether the authentication criterion is met at 306, the second terminal obtains size information of the generated barcode, calculates size information of the captured barcode, and adjusts, based on the size information of the generated barcode and the size information of the captured barcode, the image characteristic of the surrounding image of the generated barcode and the image characteristic of the surrounding image of the captured barcode to have the same or similar size scale. Thereafter, when determining whether the authentication criterion is met, the comparison is made under the same scale size of the image characteristics of the surrounding images.

The following practical implementation is described for illustrating one example embodiment of the present techniques.

Figure 4:
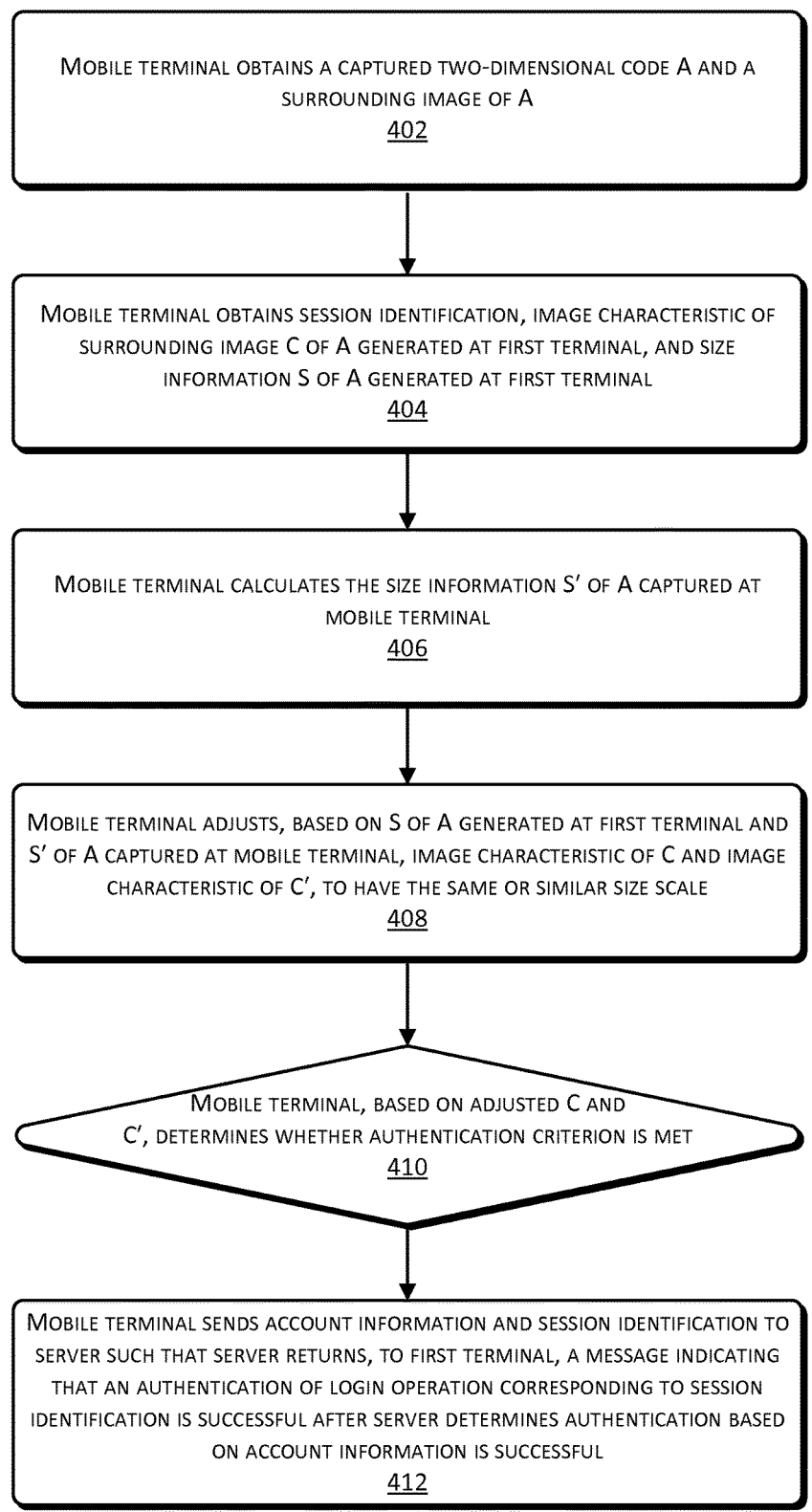
FIG. 4 is a flowchart illustrating a second example embodiment of an example method for authenticating based on a barcode according to the present disclosure.

FIG. 4 is a flowchart illustrating a second example embodiment of an example method for authenticating based on a barcode according to the present disclosure. In this example embodiment, for example, a first terminal is a PC and a second terminal is a mobile terminal. The barcode is a two-dimension barcode. A specific operation is a login operation and operation identification is session identification. The present disclosure does not impose any limitation herein. This example embodiment may be applied at the mobile terminal.

At 402, the mobile terminal captures a two-dimensional code A and a surrounding image of the two-dimensional code A.

For example, a minimum size may be preset for capturing the surrounding image and such minimum size corresponds to the size of the image characteristic of the surrounding image when the two-dimensional code is generated. When a size of the captured surrounding image is smaller than the minimum size, the image may be automatically recaptured or a message is prompted to the user to re-capture the image.

At 404, the mobile terminal obtains a session identification, the image characteristic of the surrounding image C of the two-dimensional code A generated at the first terminal, and size information S of the two-dimensional code A generated at the first terminal. The session identification corresponds to the login operation at the PC.

In this example embodiment, if the two-dimensional code obtained at 402 is a two-dimensional code generated according to the example embodiment shown in FIG. 1. Therefore, at 402, the image characteristic of the surrounding image of the generated two-dimensional code is directly obtained from the two-dimensional code. If the two-dimensional code obtained at 402 is a two-dimensional code generated according to the example embodiment shown in FIG. 2, at 402, the image characteristic of the surrounding image of the generated two-dimensional code generating may be obtained from the server.

At 406, the mobile terminal calculates the size information S' of the two-dimensional code A captured at the mobile terminal.

At 408, the mobile terminal adjusts, based on the size information S of the two-dimensional code A generated at the first terminal and the size information S' of the two-dimensional code A captured at the mobile terminal, the image characteristic of the surrounding image C and the image characteristic of the surrounding image C', to have the same or similar size scale.

For example, bases on the size information S of the generated two-dimensional code and the size information S' of the obtained two-dimensional code, the size of image characteristic C of the surrounding image of the generated two-dimensional code is adjusted to the same size as the size of the image characteristic C' of the surrounding image of the captured two-dimensional code. That is, after the adjustment, C'=C×S'/S. Alternatively, C is adjusted to the size of C, i.e., C=C'×S/S'. Alternatively, C and C' may be both adjusted to have a same or similar size.

At 410, the mobile terminal, based on the adjusted C and C' at 408, determines whether an authentication criterion is met. If it is met, then operations at 412 are performed. For example, the authentication criterion may include whether a similarity degree between the image characteristic of the adjusted surrounding image of the captured two-dimensional code C' and the image characteristic of the adjusted surrounding image C of the generated two-dimensional code is larger than or equal to a preset threshold. For instance, the preset threshold may be 80%, 90%, etc., which may be configured based on a resolution of the capturing apparatus of the mobile terminal.

At 412, the mobile terminal sends the account information stored in the mobile terminal and the session identification to the server such that the server returns, to the first terminal, a message indicating the authentication of the login operation corresponding to the session identification is successful after the server determines that the authentication based on the account information is successful. The first terminal then uses the account information to perform the login operation.

In the first example embodiment and the second example embodiment of the authentication method, the second terminal determines whether the authentication criterion is met. If it is met, then the operating identification and the account information needed for authentication will be sent to the server for authentication. In fact, in the example embodiments of the present disclosure, the server may be also used to determine whether the authentication criterion is met. The following example embodiment is described accordingly.

Figure 5:
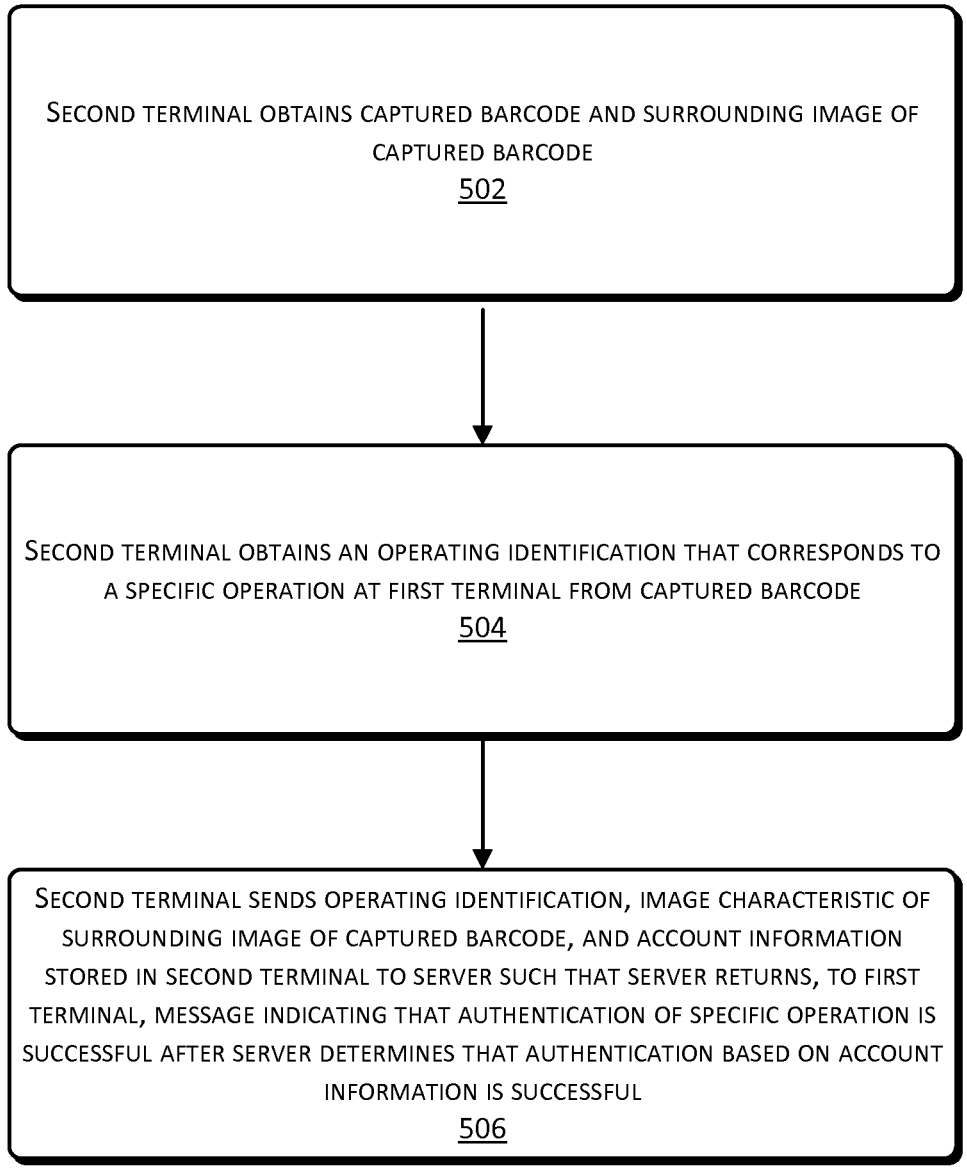
FIG. 5 is a flowchart illustrating a third example embodiment of an example method for authenticating based on a barcode according to the present disclosure.

FIG. 5 is a flowchart illustrating a third example embodiment of an example method for authenticating based on a barcode according to the present disclosure. This example embodiment may be applied at a second terminal.

At 502, the second terminal obtains a captured barcode and the surrounding image of the captured barcode;

The obtained barcode and surrounding image may be generated according to either of the two example embodiments as shown in FIGS. 1 and 2.

In this example embodiment, the second terminal may be a terminal device such as a computer, a cell phone, a PAD, etc. The second terminal has a capturing apparatus which has capturing or photographing functionalities.

The barcode may include a one-dimensional barcode, a two-dimensional barcode, a color barcode, etc.

At 504, the second terminal obtains an operating identification from the captured barcode. The operating identification corresponds to a specific operation at a first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

At 506, the second terminal sends the operating identification, the image characteristic of the surrounding image of the captured barcode, and the account information stored in the second terminal to the server such that the server returns, to the first terminal, a message indicating the authentication of the specific operation is successful after the server determines that the authentication based on the account information is successful. When the first terminal receives the message indicating that the authentication is successful, the first terminal authorizes the specific operation. The authentication criterion may include whether a similarity degree between the image characteristic of the surrounding image of the captured barcode and the image characteristic of the surrounding image of the generated barcode is larger than or equal to a preset threshold.

It is noted that position information of the image characteristic of the surrounding image of the captured barcode is consistent with the position information of the image characteristic of the surrounding image of the generated barcode. For example, if the image characteristic of the surrounding image of the generated is the image characteristic of the first surrounding area of the generated barcode, then the image characteristic of the surrounding image of the captured barcode is the image characteristic of the first surrounding area of the captured barcode.

In this example embodiment, the server determines whether the authentication criterion such as whether the similarity degree between the image characteristic of the surrounding image of the generated barcode and the image characteristic of the surrounding image of the captured barcode is larger than or equal to the preset threshold. If a result is positive, the present techniques conclude that the authentication criterion is met. The surrounding image of the captured barcode is consistent with the surrounding image of the generated barcode. Thus, the captured barcode is not considered as a barcode placed on a fake webpage by a hacker or sent by the hacker in a group sending. If the authentication based on the account information is successful, a message indicating the authentication is successful is sent to the first terminal.

The image characteristic of the surrounding image of the captured barcode is retrieved, by the second terminal, from the surrounding image of the obtained barcode at 502. The image characteristic of the surrounding image of the generated barcode is also obtained by the second terminal. For example, if the barcode and the surrounding image obtained at 502 of this present embodiment are generated according to the example embodiment as shown in FIG. 1, then the image characteristic of the surrounding image of the generated barcode is obtained, by the second terminal, from the capture barcode. When the second terminal sends operating identification, etc. to the server, the image characteristic of the surrounding image of the generated barcode that is obtained from the captured barcode is also sent to the server. If the barcode and the surrounding image obtained at 502 are generated according to the example embodiment as shown in FIG. 2, then the image characteristic of the surrounding image of the generated barcode is obtained from the server by the second terminal or the server.

It is noted that, in this step, after the server receives the information from the second terminal, the server may firstly determine whether the authentication criterion is met and then determines whether the authentication is successful. Alternatively, the server may firstly determine whether the authentication is successful and then determines whether the authentication criterion is met. When the results are both positive, then the message indicating the authentication is successful is sent to the first terminal. If either of the results is negative, then the authentication operation is terminated, or the message indicating that the authentication is failed is sent to the first terminal, and thereafter the first terminal may display an indication of operation failure.

In this example embodiment, the second terminal sends the image characteristic of the surrounding image of the captured barcode to the server, such that the server returns, to the first terminal, a message indicating the authentication of the specific operation is successful after the server determines that the authentication criterion is met or verifies the image characteristic of the surrounding image of the generated barcode is consistent with the image characteristic of the surrounding image of the captured barcode and the server determines that the authentication is successful. Thus, it is difficult for the hacker to place the barcode on a fake webpage or send the barcode through a group sending. The present techniques lower a probability for a hacker to steal users' data or resources and enhance security of authentication based on the barcode.

When the barcode generated according to this example embodiment is captured, as it is difficult to ensure sizes of different images are same, it is difficult to compare image characteristics of different surrounding images.

To solve this technical problem, in this example embodiment, prior to sending the image characteristic of the surrounding image of the captured barcode to the server at 506, the second terminal obtains size information of the generated barcode, calculates size information of the captured barcode, and adjusts, based on the size information of the generated barcode and the size information of the captured barcode, the image characteristic of the surrounding image of the generated barcode and the image characteristic of the surrounding image of the captured barcode to have the same or similar size scale. Thereafter, when determining whether the authentication criterion is met, the comparison is made under the same scale size of the image characteristics of the surrounding images.

The following practical implementation is described for illustrating one example embodiment of the present techniques.

Figure 6:
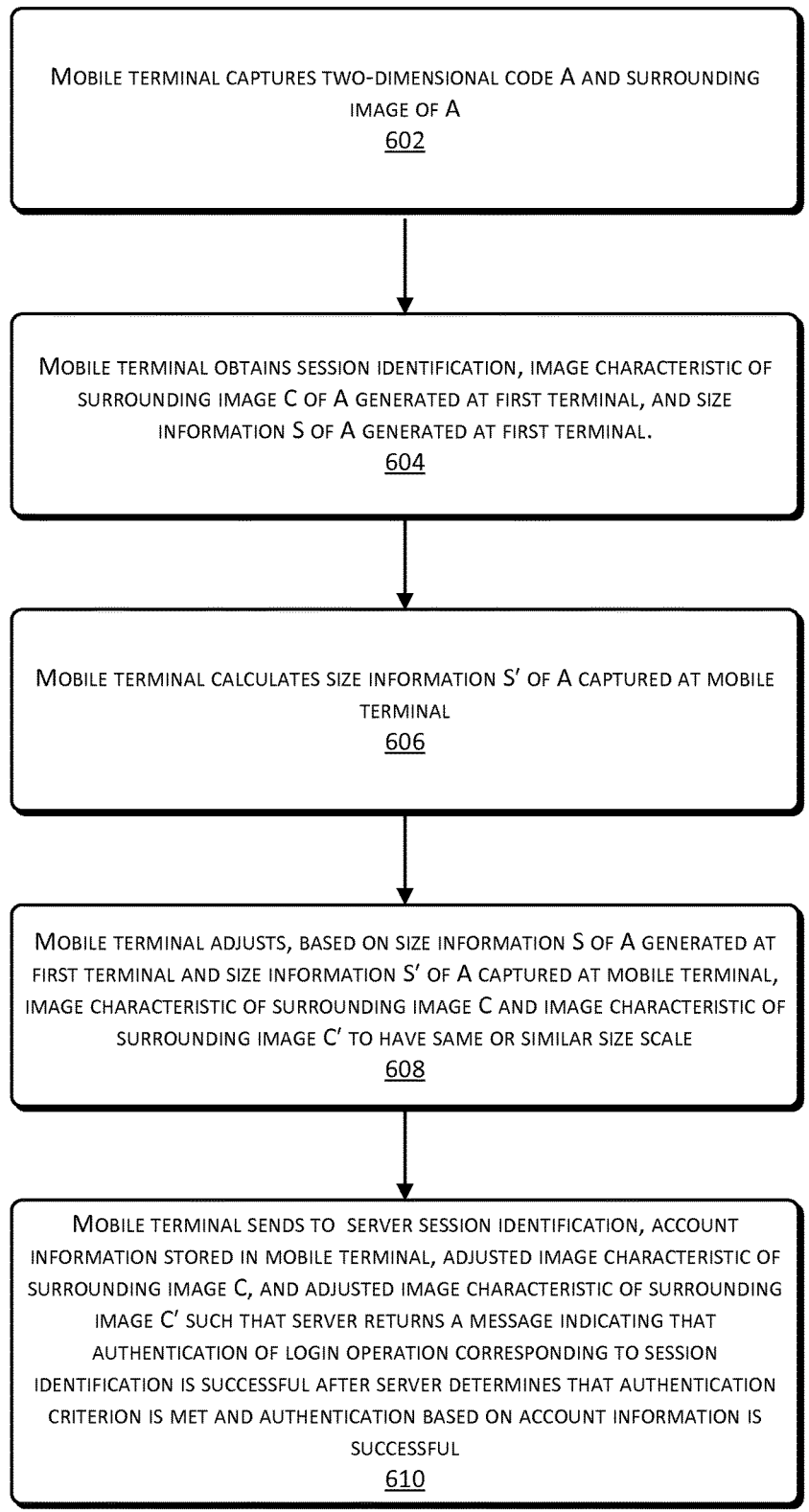
FIG. 6 is a flowchart illustrating a fourth example embodiment of an example method for authenticating based on a barcode according to the present disclosure.

FIG. 6 is a flowchart illustrating a fourth example embodiment of an example method for authenticating based on a barcode according to the present disclosure. In this example embodiment, for example, a first terminal is a PC and a second terminal is a mobile terminal. The barcode is a two-dimension barcode. A specific operation is a login operation and operation identification is session identification. The present disclosure does not impose any limitation herein. This example embodiment may be applied at the mobile terminal.

At 602, the mobile terminal captures a two-dimensional code A and a surrounding image of the two-dimensional code A.

For example, a minimum size may be preset for capturing the surrounding image and such minimum size corresponds to the size of the image characteristic of the surrounding image when the two-dimensional code is generated. When a size of the captured surrounding image is smaller than the minimum size, the image may be automatically recaptured or a message is prompted to the user to re-capture the image.

At 604, the mobile terminal obtains a session identification, the image characteristic of the surrounding image C of the two-dimensional code A generated at the first terminal, and size information S of the two-dimensional code A generated at the first terminal. The session identification corresponds to the login operation at the first terminal.

In this example embodiment, if the two-dimensional code obtained at 602 is a two-dimensional code generated according to the example embodiment shown in FIG. 1. Therefore, at 602, the image characteristic of the surrounding image of the generated two-dimensional code is directly obtained from the two-dimensional code. If the two-dimensional code obtained at 602 is a two-dimensional code generated according to the example embodiment shown in FIG. 2, at 602, the image characteristic of the surrounding image of the generated two-dimensional code generating may be obtained from the server by the second terminal. Alternatively, the image characteristic of the surrounding image of the generated two-dimensional code is not obtained at this step, the server obtains the image characteristics of the surrounding image of the generated two-dimensional code from data stored at the server afterwards.

At 606, the mobile terminal calculates the size information S' of the two-dimensional code A captured at the mobile terminal.

At 608, the mobile terminal adjusts, based on the size information S of the two-dimensional code A generated at the first terminal and the size information S' of the two-dimensional code A captured at the mobile terminal, the image characteristic of the surrounding image C and the image characteristic of the surrounding image C' to have the same or similar size scale.

For example, bases on the size information S of the generated two-dimensional code and the size information S' of the obtained two-dimensional code, the size of image characteristic C of the surrounding image of the generated two-dimensional code is adjusted to the same size as the size of the image characteristic C' of the surrounding image of the captured two-dimensional code. That is, after the adjustment, C'=C×S'/S. Alternatively, C is adjusted to the size of C, i.e., C=C'×S/S'. Alternatively, C and C' may be both adjusted to have a same or similar size.

At 610, the mobile terminal sends to the server the session identification, the account information stored in the mobile terminal, the adjusted image characteristic of the surrounding image C, and the adjusted image characteristic of the surrounding image C' such that the server returns a message indicating that the authentication of the login operation corresponding to the session identification is successful after the server determines that an authentication criterion is met and an authentication based on the account information is successful.

For example, the authentication criterion may include whether a similarity degree between the image characteristic of the surrounding image of the captured two-dimensional code and the image characteristic of the surrounding image of the generated two-dimensional code is larger than or equal to a preset threshold.

It is noted that if the two-dimensional code obtained at 602 is the two-dimensional code generated according to the example embodiment as shown in FIG. 2, and the image characteristic of the surrounding image C of the generated two-dimensional code generating is obtained by the server from the server, then it is not necessary for the mobile terminal to send C.

In the third example embodiment and the fourth example embodiment of the authentication method, the second terminal sends to the server the information needed for authentication and the information needed for determining whether the authentication criterion is met, and the server determines whether the authentication criterion is met and whether the authentication is successful. If both of the results are positive, then the message indicating that the authentication is successful is returned.

The above example embodiments of the present disclosure describe method for generating a barcode. The following description describes the terminal of the present disclosure from a perspective of a modularized functional entity.

Figure 7:
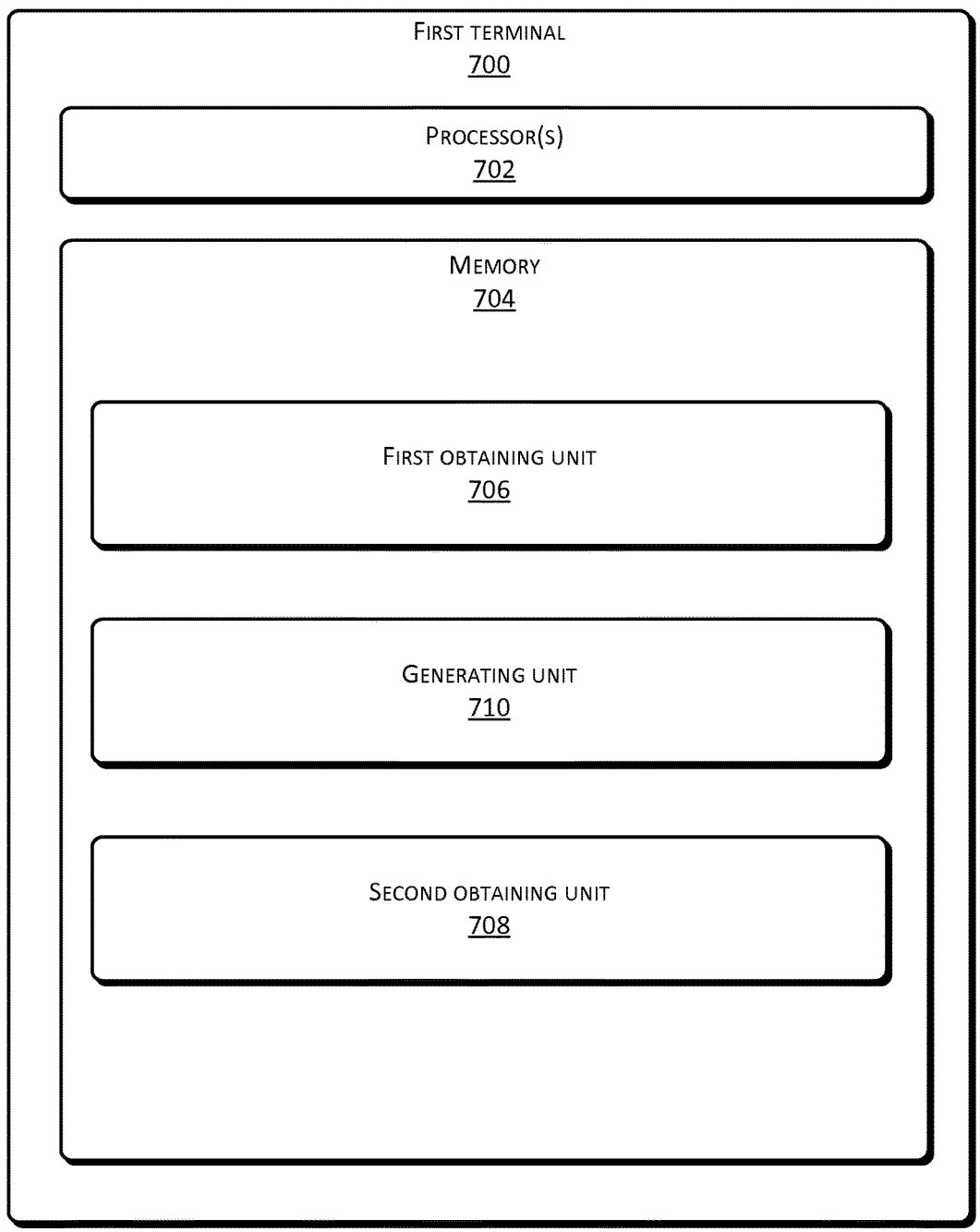
FIG. 7 is a schematic diagram illustrating a first example embodiment of an example first terminal according to the present disclosure.

FIG. 7 is a schematic diagram illustrating a first example embodiment of an example first terminal 700 according to the present disclosure. The first terminal 700 may include one or more processor(s) or data processing unit(s) 702 and memory 704. The memory 704 is an example of computer-readable media. The memory 704 may store therein a plurality of modules or units including a first obtaining unit 706, a second obtaining unit 708, and a generating unit 710.

The first obtaining unit 706 obtains an operating identification. The operating identification corresponds to a specific operation at the first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

The second obtaining unit 708 obtains an image characteristic of a surrounding image that surrounds an area of a barcode to be generated.

For example, prior to generating the barcode, the first terminal allocates an area where the barcode is generated. This area is the area of the barcode to be generated.

For example, the first terminal 700 obtains the surround image that surrounds the area of the barcode to be generated and extracts the image characteristic of the surrounding image. The surrounding image surrounds the barcode. It is not necessary that the surrounding image connects to a border of the barcode as long as the surrounding image is within a preset area adjacent to the barcode. For example, the surrounding image may be an image at a first area that is on top of the barcode, or an image at a second area that is at a left side of the barcode, or a combination of these two areas. For example, the surrounding image may be obtained by the second obtaining unit 708 by using a screenshot capture program, such as a browser screenshot plug-in program.

For example, the image characteristic may by any one or more of the characteristics including a grayscale characteristic, a color characteristic, and a character characteristic of the image. For instance, the second obtaining unit 708 obtains a grayscale bar chart of the surrounding image, or performs an optical character recognition (OCR) of the surrounding image to obtain the character characteristic.

A size of the obtained surrounding image may be preset. Security of authentication process may be enhanced by obtaining a large size of the surrounding image. For example, the size of the surrounding mage may be more than half of a displaying screen or even a whole displaying screen.

The generating unit 710 generates the barcode based on the operating identification obtained by the first obtaining unit 706 and the image characteristic obtained by the second obtaining unit 708. The image characteristic is used as the image characteristic of the surrounding image of the generated barcode.

For example, the barcode may include a one-dimensional barcode, a two-dimensional barcode, a color barcode, etc.

In the example embodiment of the present disclosure, the generating unit 710 generates the barcode based on the operating identification and the image characteristic. That is, the generated barcode includes information of the operating identification and the image characteristic. In addition, the image characteristic of the generated barcode is used to verify, during the authentication of the barcode, whether the image characteristic of the generated barcode is consistent with the image characteristic of the surrounding image of a captured barcode.

In this example embodiment, the generating unit 710 generates the barcode based on not only the operating identification corresponding to the specific operation but also the image characteristic of the surrounding image of the generated barcode. Therefore when the authentication operation is performed based on the generated barcode in this example embodiment, the present techniques also verify whether the image characteristic of the surrounding image of the captured barcode is consistent with the image characteristic of the surrounding image of the generated barcode. Only when they are consistent, the message indicating that the authentication is successful is returned. Thus, a barcode placed by a hacker on a fake webpage or through a group sending becomes difficult to be used for authentication. The present techniques lower a probability for a hacker to steal users' data or resources and enhance security of authentication based on the barcode.

In this example embodiment, the first terminal may be a terminal device such as a computer, a cell phone, a PAD, etc.

When the barcode generated according to this example embodiment is captured, as it is difficult to ensure sizes of different images are same, it is difficult to compare image characteristics of different surrounding images.

To solve this technical problem, in this example embodiment, the first terminal 700 may further include a third obtaining unit (not shown in FIG. 7). The third obtaining unit obtains size information of the area of the barcode to be generated. The generating unit 710 generates the barcode based on the size information too. Alternatively, the first terminal 700 may include a sending unit (not shown in FIG. 7). The sending unit sends the size information to a server to store the size information. The size information is used as size information of the generated barcode. In other words, in this example embodiment, the size information of the area of the barcode to be generated may also be used as the size information of the generated barcode, and the size information is added into the barcode or stored in the server. Therefore, when image characteristic of the surrounding image of the barcode is verified, the size information of the generated barcode and the size information of the captured barcode may be used to adjust the two image characteristics of the surrounding images to be compared at a same or similar size scale for comparison.

In this example embodiment, the image characteristic of the surrounding image may be added into the barcode such that the image characteristic of the surrounding image is verified when the authentication operation based on the barcode is performed. In fact, the present disclosure also provides another method for generating a barcode, which also implements verification of the image characteristic of the surrounding image and is described in the following example embodiment.

Figure 8:
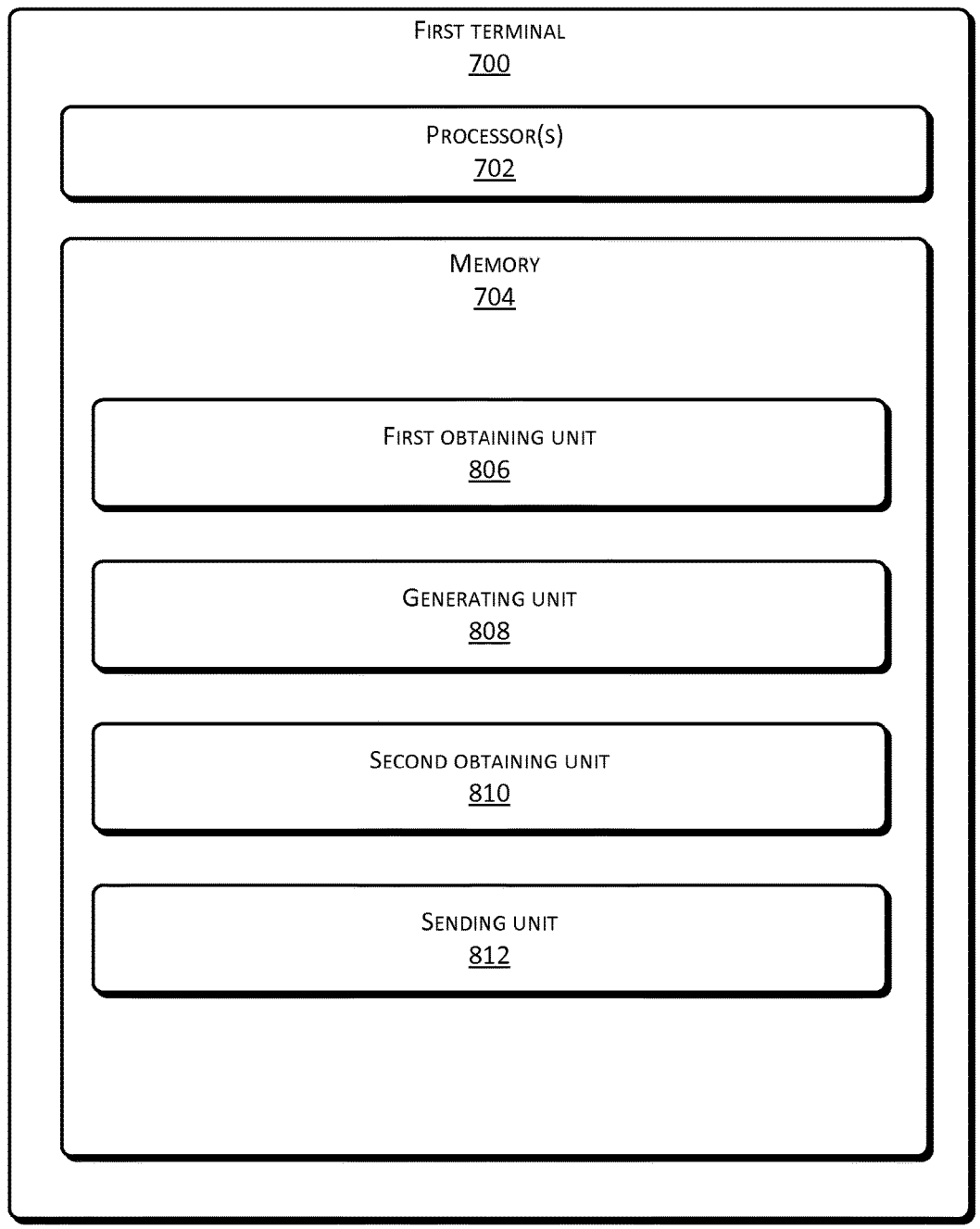
FIG. 8 is a schematic diagram illustrating a second example embodiment of an example first terminal according to the present disclosure.

FIG. 8 is a schematic diagram illustrating a second example embodiment of an example first terminal 800 according to the present disclosure. The first terminal 800 may include one or more processor(s) or data processing unit(s) 802 and memory 804. The memory 804 is an example of computer-readable media. The memory 804 may store therein a plurality of modules or units including a first obtaining unit 806, a generating unit 808, a second obtaining unit 810, and a sending unit 812.

The first obtaining unit 806 obtains an operating identification. The operating identification corresponds to a specific operation at the first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

The generating unit 808 generates the barcode based on the operating identification obtained by the first obtaining unit 806.

For example, the barcode may include a one-dimensional barcode, a two-dimensional barcode, a color barcode, etc.

In the embodiment of the present disclosure, the barcode is generated based on the operating identification. That is, information of the operating identification is included in the generated barcode.

The second obtaining unit 810 obtains an image characteristic of a surrounding image that surrounds the barcode.

For example, the second obtaining unit 810 obtains the surround image that surrounds the barcode and extracts the image characteristic of the surrounding image. The surrounding image surrounds the barcode. It is not necessary that the surrounding image connects to a border of the barcode as long as the surrounding image is within a preset area adjacent to the barcode. For example, the surrounding image may be an image at a first area that is on top of the barcode, or an image at a second area that is at a left side of the barcode, or a combination of these two areas. For example, the surrounding image may be obtained by the first terminal by using a screenshot capture program, such as a browser screenshot plug-in program.

For example, the image characteristic may by any one or more of the following characteristics including a grayscale characteristic, a color characteristic, and a character characteristic of the image. For instance, the second obtaining unit 810 obtains a grayscale bar chart of the surrounding image, or performs an optical character recognition (OCR) of the surrounding image to obtain the character characteristic.

A size of the obtained surrounding image may be preset. Security of authentication process may be enhanced by obtaining a larger size of the surrounding image. For example, the size of the surrounding mage may be more than half of a displaying screen or even a whole displaying screen.

The sending unit 812 sends the image characteristic to the server to be stored in the server. The image characteristic is used as the image characteristic of the surrounding image that surrounds the generated barcode.

This example embodiment is different from the first embodiment of the first terminal in which, in this example embodiment, the image characteristic of the surrounding image of the generated barcode is not added into the barcode and is stored in the server instead. The image characteristic of the surrounding image of the generated barcode is used for verifying, in a barcode authentication, whether it is consistent with the image characteristic of the surrounding image of the captured barcode.

In this example embodiment, the image characteristic of the surrounding image of the generated barcode is sent to the server to store the image characteristic of the surrounding image of the generated barcode in the server. When performing the authentication operation based on the barcode generated in this example embodiment, the image characteristic of the surrounding image of the generated barcode and the image characteristic of the surrounding image of the captured barcode are compared to verify whether they are consistent. Only when they are consistent, the message indicating the authentication is successful is returned. Thus, a barcode placed by a hacker on a fake webpage or through a group sending becomes difficult to be used for authentication. The present techniques lower a probability for a hacker to steal users' data or resources and enhance security of authentication based on the barcode.

When the barcode generated according to this example embodiment is captured, as it is difficult to ensure sizes of different images are same, it is difficult to compare image characteristics of different surrounding images.

To solve this technical problem, in this example embodiment, the first terminal 800 may further include a third obtaining unit (not shown in FIG. 8). The third obtaining unit obtains size information of the area of the barcode to be generated. The generating unit 808 generates the barcode based on the size information too. Alternatively, the sending unit 812 sends the size information to a server to store the size information. The size information is used as size information of the generated barcode. In other words, in this example embodiment, the generating unit 808 adds size information of the generated barcode into the generated barcode to store or the sending unit 812 sends the size information of the generated barcode to the server to store. Therefore, when image characteristic of the surrounding image of the barcode is verified, the size information of the generated barcode and the size information of the captured barcode may be used to adjust the two image characteristics of the surrounding images to be compared at a same or similar size scale for comparison.

In the above two examples embodiments of the first terminal, the image characteristic of the surrounding image of the barcode is stored in the barcode or in the server when the barcode is generated to verify the image characteristic of the surrounding image during performing authentication operation based on the barcode. Therefore, an authentication is successful only when the surrounding image of the captured barcode is consistent with the surrounding image of the generated barcode. The following description describes example authentication processes based on the generated barcodes in either example embodiment of the first terminal.

Figure 9:
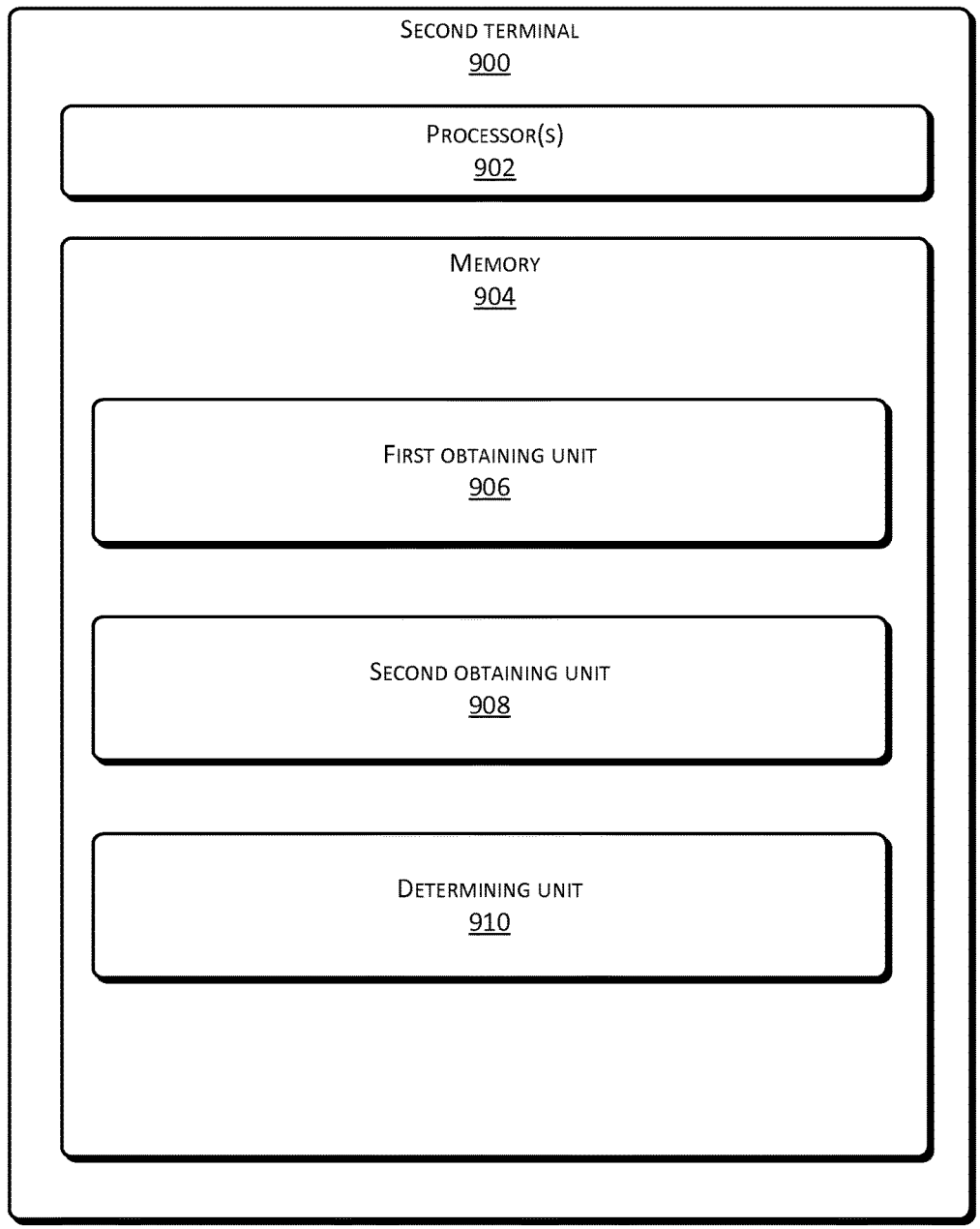
FIG. 9 is a schematic diagram illustrating a first example embodiment of an example second terminal according to the present disclosure.

FIG. 9 is a schematic diagram illustrating a first example embodiment of an example second terminal 900 according to the present disclosure. The second terminal 900 may include one or more processor(s) or data processing unit(s) 902 and memory 904. The memory 904 is an example of computer-readable media. The memory 904 may store therein a plurality of modules or units including a first obtaining unit 906, a second obtaining unit 908, and a determining unit 910.

The first obtaining unit 906 obtains a captured barcode and a surrounding image the captured barcode.

For example, the captured barcode and the surrounding image may be generated by any of the example embodiments of the first terminal.

For example, the barcode in the example embodiment of the present disclosure may include a one-dimensional barcode, a two-dimensional barcode, a color barcode, etc.

The second obtaining unit 908 obtains an operating identification. The operating identification corresponds to a specific operation at a first terminal.

In this example embodiment, the operating identification corresponds to a specific operation of the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

The determining unit 910 determines whether an authentication criterion is met. If the authentication criterion is met, the determining unit 910 sends the operation identification and account information stored at the second terminal to the server. The server returns a message indicating that an authentication of the specific operation corresponding to the operation identification is successful to the first terminal. When the first terminal receives such message, the first terminal authorizes the specific operation.

For example, the authentication criterion may include whether a similarity degree between an image characteristic of the surrounding image of the captured barcode and an image characteristic of the surrounding image of the generated barcode is larger than or equal to a preset threshold.

The determining unit 910 determines whether the authentication criterion is met, i.e., whether the similarity degree between the image characteristic of the surrounding image of the captured barcode and the image characteristic of the surrounding image of the generated barcode is larger than or equal to the preset threshold. If a result is positive, then the authentication criterion is met and the surrounding image of the captured barcode is consistent with the surrounding image of the generated barcode. The barcode is determined not as a barcode placed on a fake webpage by the hacker or is massively sent by the hacker. Thereafter, the account information required for authentication is permitted to be sent to the server. After the server determines that the authentication is successful, the server returns the message indicating that the authentication of the specific operation corresponding to the operation identification is successful to the first terminal. If the server determines that the authentication is failed based on the account information, the returns the message indicating that the authentication of the specific operation corresponding to the operation identification is failed to the first terminal. The first terminal may display a message indicating operation failure.

For example, the image characteristic of the surrounding image of the captured barcode is extracted by the second obtaining unit 908 from the surrounding image of the captured barcode obtained by the first obtaining unit 906. The second obtaining unit 908 also obtains the image characteristic of the surrounding image of the generated barcode. For example, if the barcode and the surrounding image obtained by the first obtaining unit 906 are those generated according to the first example embodiment as shown in FIG. 1, then the image characteristic of the surrounding image of the generated barcode is obtained from the captured barcode by the second obtaining unit 908. If the barcode and the surrounding image obtained by the first obtaining unit 906 are those generated according to the second example embodiment as shown in FIG. 2, then the image characteristic of the surrounding image of the generated barcode is obtained from the server by the second obtaining unit 908.

It is noted that position information of the image characteristic of the surrounding image of the captured barcode is consistent with the position information of the image characteristic of the surrounding image of the generated barcode. For example, if the image characteristic of the surrounding image of the generated is the image characteristic of the first surrounding area of the generated barcode, then the image characteristic of the surrounding image of the captured barcode is the image characteristic of the first surrounding area of the captured barcode.

In this example embodiment, before the authentication is determined based on the barcode, the determining unit 910 determines whether the authentication criterion is met. That is, the determining unit 910 determines whether the image characteristic of the surrounding image of the generated barcode is consistent with the image characteristic of the surrounding image of the captured barcode. Only when the authentication criterion is met, i.e., the image characteristic of the surrounding image of the generated barcode is consistent with the image characteristic of the surrounding image of the captured barcode, it is possible that the message indicating that the authentication is successful is returned. Thus, the barcode placed by the hacker on the fake webpage or sent by the hacker through a group sending is difficult to be used for authentication. The present techniques lower a probability for a hacker to steal users' data or resources and enhance security of authentication based on the barcode.

For example, the second terminal 900 may be a terminal device such as a computer, a cell phone, a PAD, etc. The second terminal 900 may also include a capturing apparatus (not shown in FIG. 9) that has capturing or photographing functionalities.

When the barcode generated according to this example embodiment is captured, as it is difficult to ensure sizes of different images are same, it is difficult to compare image characteristics of different surrounding images.

To solve this technical problem, in this example embodiment, the second terminal 900 may further include a third obtaining unit, a calculating unit, and an adjusting unit (not shown in FIG. 9). Before the determining unit 910 determines whether the authentication criterion is met, the third obtaining unit obtains size information of the generated barcode. The calculating unit calculates size information of the captured barcode. The adjusting unit adjusts, based on the size information of the generated barcode and the size information of the captured barcode, the image characteristic of the surrounding image of the generated barcode and the image characteristic of the surrounding image of the captured barcode to have the same or similar size scale. Thereafter, when determining whether the authentication criterion is met, the comparison is made under the same scale size of the image characteristics of the surrounding images.

In the first embodiment of the second terminal, the determining unit 910 in the second terminal 900 determines whether the authentication criterion is met, and if it is met, then the operating identification and the account information needed for authentication is sent to the server for authentication. In fact, in the example embodiment of the present disclosure, the server may be also used to determine whether the authentication criterion is met as shown below.

Figure 10:
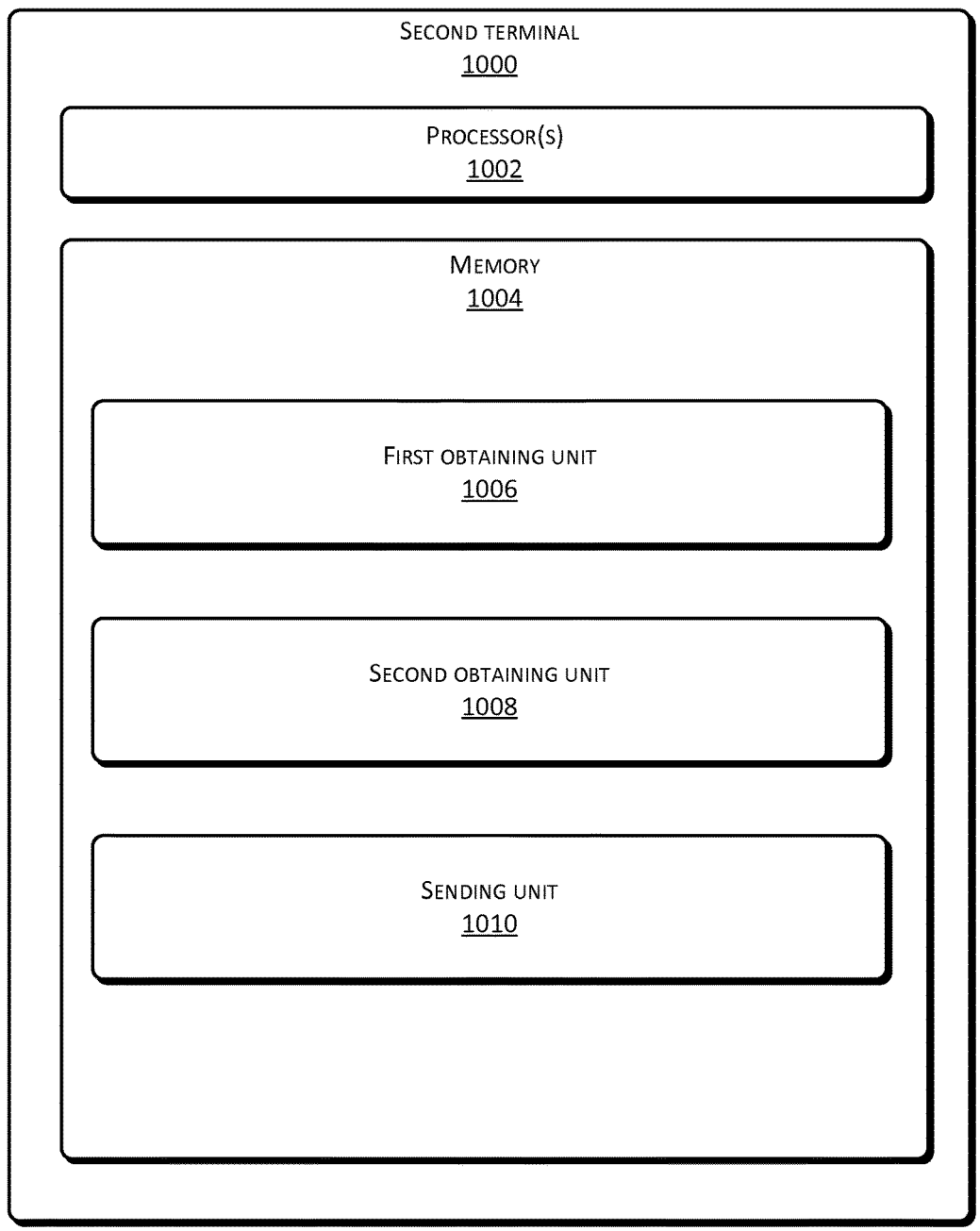
FIG. 10 is a schematic diagram illustrating a second example embodiment of an example second terminal according to the present disclosure.

FIG. 10 is a schematic diagram illustrating a second example embodiment of an example second terminal 1000 according to the present disclosure. The second terminal 1000 may include one or more processor(s) or data processing unit(s) 1002 and memory 1004. The memory 1004 is an example of computer-readable media. The memory 1004 may store therein a plurality of modules or units including a first obtaining unit 1006, a second obtaining unit 1008, and a sending unit 1010.

The first obtaining unit 1006 obtains a captured barcode and the surrounding image of the captured barcode;

The obtained barcode and surrounding image may be generated according to any example embodiment of the first terminal.

The barcode may include a one-dimensional barcode, a two-dimensional barcode, a color barcode, etc.

The second obtaining unit 1008 obtains an operating identification from the captured barcode. The operating identification corresponds to a specific operation at the first terminal.

In this example embodiment, the operating identification corresponds to a specific operation at the first terminal. The operating identification may be any one or more of the following items including a terminal identification, a session (dialogue) identification, an order number, a tracking number, etc. For example, if the operating identification is the terminal identification or the session identification, such operation identification may correspond to a login operation. If the operating identification is the order number or the tracking number, such operation identification may correspond to a payment operation. As long as the operating identification corresponds to a specific operation, the present disclosure does not limit details of the operating identification.

The sending unit 1010 sends the operating identification, the image characteristic of the surrounding image of the captured barcode, and the account information stored in the second terminal 1000 to the server. The server returns, to the first terminal, a message indicating the authentication of the specific operation is successful after the server determines that the authentication based on the account information is successful. When the first terminal receives the message indicating that the authentication is successful, the first terminal authorizes the specific operation. The authentication criterion may include whether a similarity degree between the image characteristic of the surrounding image of the captured barcode and the image characteristic of the surrounding image of the generated barcode is larger than or equal to a preset threshold.

It is noted that position information of the image characteristic of the surrounding image of the captured barcode is consistent with the position information of the image characteristic of the surrounding image of the generated barcode. For example, if the image characteristic of the surrounding image of the generated is the image characteristic of the first surrounding area of the generated barcode, then the image characteristic of the surrounding image of the captured barcode is the image characteristic of the first surrounding area of the captured barcode.

In this example embodiment, the server determines whether the authentication criterion such as whether the similarity degree between the image characteristic of the surrounding image of the generated barcode and the image characteristic of the surrounding image of the captured barcode is larger than or equal to the preset threshold. If a result is positive, the present techniques conclude that the authentication criterion is met. The surrounding image of the captured barcode is consistent with the surrounding image of the generated barcode. Thus, the captured barcode is not considered as a barcode placed on a fake webpage by a hacker or sent by the hacker in a group sending. If the authentication based on the account information is successful, a message indicating the authentication is successful is sent to the first terminal.

The image characteristic of the surrounding image of the captured barcode is extracted, by the second obtaining unit 1008, from the surrounding image of the captured barcode obtained by the first obtaining unit 1006. The image characteristic of the surrounding image of the generated barcode is also obtained by the second obtaining unit 1008 or the server. For example, if the captured barcode and the surrounding image obtained by the first obtaining unit 1006 of this present embodiment are generated according to the example embodiment as shown in FIG. 1, then the image characteristic of the surrounding image of the generated barcode is obtained, by the second obtaining unit 1008, from the capture barcode. When the sending unit 1010 sends operating identification, etc. to the server, the image characteristic of the surrounding image of the generated barcode that is obtained from the captured barcode is also sent to the server. If the captured barcode and the surrounding image obtained by the first obtaining unit 1006 are generated according to the example embodiment as shown in FIG. 2, then the image characteristic of the surrounding image of the generated barcode is obtained from the server by the second obtaining unit 1008 or the server.

It is noted that, in this step, after the server receives the information from the seconding unit 1010, the server may firstly determine whether the authentication criterion is met and then determines whether the authentication is successful. Alternatively, the server may firstly determine whether the authentication is successful and then determines whether the authentication criterion is met. When the results are both positive, then the message indicating the authentication is successful is sent to the first terminal. If either of the results is negative, then the authentication operation is terminated, or the message indicating that the authentication is failed is sent to the first terminal, and thereafter the first terminal may display an indication of operation failure.

In this example embodiment, the seconding unit 1010 sends the image characteristic of the surrounding image of the captured barcode to the server, such that the server returns, to the first terminal, a message indicating the authentication of the specific operation is successful after the server determines that the authentication criterion is met or verifies the image characteristic of the surrounding image of the generated barcode is consistent with the image characteristic of the surrounding image of the captured barcode and the server determines that the authentication is successful. Thus, it is difficult for the hacker to place the barcode on a fake webpage or send the barcode through a group sending. The present techniques lower a probability for a hacker to steal users' data or resources and enhance security of authentication based on the barcode.

For example, the second terminal 1000 may be a terminal device such as a computer, a cell phone, a PAD, etc. The second terminal 1000 may also include a capturing apparatus (not shown in FIG. 10) that has capturing or photographing functionalities.

When the barcode generated according to this example embodiment is captured, as it is difficult to ensure sizes of different images are same, it is difficult to compare image characteristics of different surrounding images.

To solve this technical problem, in this example embodiment, the second terminal 1000 may further include a third obtaining unit, a calculating unit, and an adjusting unit (not shown in FIG. 10). The third obtaining unit obtains size information of the generated barcode. The calculating unit calculates size information of the captured barcode. The adjusting unit adjusts, based on the size information of the generated barcode and the size information of the captured barcode, the image characteristic of the surrounding image of the generated barcode and the image characteristic of the surrounding image of the captured barcode to have the same or similar size scale.

For the convenience of description, the above terminals or devices are described by separate units according to functions. It is noted that the functions of the units may be achieved in one or more software and/or hardware.

One of ordinary skill in the art should understand that the embodiments of the present disclosure may be methods, systems, or the programming products of computers. Therefore, the present disclosure may be implemented by hardware, software, or in combination of both. In addition, the present techniques may be presented in a form of one or more computer programs containing the computer-executable instructions which may be implemented in the computer-readable medium (including but not limited to disks, CD-ROM, optical disks, etc.) that instruct one or more computing devices (such as PC, server, or network device) to perform some or all operations as described in the method embodiments of the present disclosure.

In a standard configuration, a terminal, a server in a form of a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer-readable media or computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The example embodiments of the present disclosure are described progressively. Each example embodiment emphasizes differences from another example embodiment. Same and similar portions of the example embodiments may refer to each other. The example terminal embodiments are similar to the example method embodiments and are thus described briefly. Relevant portions of the terminal embodiments may refer to relevant portions of the example method embodiments.

The example embodiments are described by referring to the flow charts and/or block diagrams of the method, device (system) and computer program of the embodiments of the present disclosure. It should be understood that each flow and/or block and the combination of the flow and/or block of the flowchart and/or block diagram may be implemented by computer program instructions. These computer program instructions may be provided to the general computers, specific computers, embedded processor or other programmable data processors to generate a machine, so that a device of implementing one or more flows of the flow chart and/or one or more blocks of the block diagram may be generated through the instructions operated by a computer or other programmable data processors.

These computer program instructions may also be stored in other computer-readable storage which may instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions may also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

It should be noted that the relationship terms such as "a first," "a second," etc. are only used to differentiate one entity or operation from another entity or operation and do not necessarily imply that there is such actual relationship or sequence between the entities or operations. In addition, the terms "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

The present techniques may be applied in many general or proprietary computing system environment or configuration such as a personnel computer, a server computer, a handheld equipment or a portable equipment, a tablet equipment, a multi-processor system, a system based on micro-processor, a set-top box, a programmable consumer electronics, a network PC, a mini-computer, a mainframe computer, a distributed computing environment which includes any of the above systems or equipment, etc.

The present techniques may be described in the general context of computer executable instructions executed by a computer, such as a program module. Generally, a program module includes routines, programs, objects, components, data structures, etc. that execute specific job or realize specific abstract data type. The present techniques may be also realized in distributed computing environment, where the job is executed by remote processing equipment connected through communication networks. In the distributed computing environment, program module can be located in the local and remote computer storage medium including the storage device.

Although the present disclosure is described through the example embodiments, one of ordinary skill in the art may modify or change the present disclosure without departing from the spirit of the present disclosure. The appended claims cover such modifications and variations without departing from the spirit of the present disclosure.

What is claimed is:

1. A method for generating a barcode, the method comprising:
    obtaining an operation identification corresponding to a specific operation;
    determining an area where a barcode is to be generated;
    obtaining an image characteristic of a surrounding image that is within a preset range adjacent to the area, the image characteristic of the surrounding image including a color characteristic of the surrounding image, the surrounding image being distinct from the area; and
    generating the barcode at least based on the operation identification and the image characteristic of the surrounding image, the barcode including information of the operation identification and the color characteristic of the surrounding image.

2. The method as recited in claim 1, further comprising obtaining a size of the area of the barcode to be generated,
    wherein the generating the barcode at least based on the operation identification and the image characteristic includes generating the barcode further based on the size of the area of the barcode.

3. The method as recited in claim 2, wherein the barcode includes information of the size.

4. The method as recited in claim 1, wherein the operating identification includes a terminal identification of a terminal equipment that performs the specific operation.

5. The method as recited in claim 1, wherein the specific operation is a log-in operation.

6. The method as recited in claim 5, wherein the operation identification is a session identification corresponding to the log-in operation.

7. The method as recited in claim 1, wherein the specific operation is a payment operation.

8. The method as recited in claim 7, wherein the operation identification is an order number or a track number.

9. The method as recited in claim 1, wherein the image characteristic includes a grayscale characteristic.

10. The method as recited in claim 1, wherein the image characteristic includes a character characteristic.

11. The method as recited in claim 1, wherein the barcode includes:
    a one-dimension code;
    a two-dimension code; or
    a color barcode.

12. The method as recited in claim 1, wherein the image characteristic further includes a character characteristic of the surrounding image.

13. A method for generating a barcode, the method comprising:
    obtaining an operation identification corresponding to a specific operation;
    determining an area where a barcode is to be generated;
    generating the barcode at least partly based on the operation identification;
    determining a surrounding image that is within a preset range adjacent to the area, the surrounding image being distinct from the area;
    obtaining an image characteristic of the surrounding image; and
    sending the image characteristic of the surrounding image to a server for storage.

14. The method as claimed in claim 13, further comprising obtaining a size of the barcode.

15. The method as recited in claim 14, wherein the generating further includes generating the barcode at least partly based on the operation identification and the size information.

16. The method as recited in claim 14, further comprising sending the size information to the server for storage.

17. A terminal comprising:
    one or more processors; and one or more memories having stored thereupon a plurality of computer-executable instructions that, when executed by the one or more processors, causes the one or more processors to perform actions comprising:

obtaining an operation identification corresponding to a specific operation, the specific operation including a log-in operation, the operation identification including a session identification corresponding to the log-in operation;

determining an area where a barcode is to be generated;

determining a surrounding image that is within a preset range adjacent to the area at least according to a preset size of the surrounding image;

obtaining an image characteristic of the surrounding image; and generating the barcode at least based on the operation identification and the image characteristic, the barcode including information of the operation identification and the image characteristic.

18. The terminal as recited in claim 17, wherein the image characteristic includes a color characteristic.

19. The terminal as recited in claim 17, wherein the actions further comprise obtaining a size of the area of the barcode to be generated, wherein the generating the barcode is at least based on the operation identification and the image characteristic includes generating the barcode further based the size of the area of the barcode.

20. The terminal as recited in claim 17, wherein the image characteristic includes a grayscale characteristic of the surrounding image.

* * * * *